(12) United States Patent
Kalthoff et al.

(10) Patent No.: US 9,353,856 B2
(45) Date of Patent: May 31, 2016

(54) METHOD FOR ADAPTING SHIFTS IN A MOTOR VEHICLE TRANSMISSION

(75) Inventors: Rudolf Kalthoff, Weingarten (DE); Jörg Kurth, Meckenbeuren (DE); Roland Mair, Tettnang (DE); Thomas Jäger, Meckenbeuren (DE); Florian Schneider, Lindenberg (DE)

(73) Assignee: ZF FRIEDRICHSCAFEN AG, Friedrichschafen (DE)

( * ) Notice: Subject to any disclaimer, the term of this patent is extended or adjusted under 35 U.S.C. 154(b) by 195 days.

(21) Appl. No.: 14/117,734

(22) PCT Filed: Mar. 20, 2012

(86) PCT No.: PCT/EP2012/054884
§ 371 (c)(1),
(2), (4) Date: Nov. 14, 2013

(87) PCT Pub. No.: WO2012/163557
PCT Pub. Date: Dec. 6, 2012

(65) Prior Publication Data
US 2014/0088843 A1    Mar. 27, 2014

(30) Foreign Application Priority Data

May 31, 2011   (DE) .................... 10 2011 076 767

(51) Int. Cl.
*F16H 61/04*    (2006.01)
*F16H 59/48*    (2006.01)
*F16H 61/00*    (2006.01)

(52) U.S. Cl.
CPC ............ *F16H 61/04* (2013.01); *F16H 61/0437* (2013.01); *B60Y 2400/304* (2013.01); *F16H 59/48* (2013.01); *F16H 2061/0087* (2013.01)

(58) Field of Classification Search
CPC ..... F16H 61/04; F16H 61/0437; F16H 59/48; F16H 2061/0087; B60Y 2400/304
See application file for complete search history.

(56) References Cited

U.S. PATENT DOCUMENTS 5,462,499 A * 10/1995 Bullmer et al. ............... 477/120
5,812,957 A     9/1998 Iizuka
5,832,399 A    11/1998 Seichter et al.
(Continued)

FOREIGN PATENT DOCUMENTS

DE    10050169    5/2002
DE    10204185    8/2003
(Continued)

OTHER PUBLICATIONS

Wikipedia article, Tilt Sensor, printed Jun. 24, 2015.*
German Patent Office Search Report, Jul. 2, 2012.
PCT International Search Report and Written Opinion, Nov. 6, 2012.

*Primary Examiner* — John Q Nguyen
*Assistant Examiner* — Alan D Hutchinson

(57) ABSTRACT

A method provides for adapting shifts to be carried out in a transmission of a motor vehicle. The shifts are triggered by a transmission control unit and are is controlled and/or governed by the transmission control unit. An actual value corresponding to an acceleration of the motor vehicle is recorded by measuring instruments and is compared to a corresponding target value. On the basis of a deviation between the actual value and the target value, the carrying out of the subsequent shifts of the transmission control unit is adapted. The actual value corresponding to an acceleration of the motor vehicle is individually recorded for several consecutive shift stages of each shift, whereas the actual value in the individual shift stages is compared to the target value in the individual shift stages of the transmission control unit. On the basis of a deviation in the individual shift stages between the actual value and the target value, the carrying out of the subsequent shifts of the transmission control unit is individually adapted for each shift stage.

14 Claims, 1 Drawing Sheet

(56) References Cited

U.S. PATENT DOCUMENTS

| | | | |
|---|---|---|---|
| 7,715,965 B2 * | 5/2010 | Messih et al. | 701/45 |
| 2008/0215218 A1 | 9/2008 | Watanabe et al. | |
| 2009/0171524 A1 | 7/2009 | Pitzal et al. | |
| 2009/0198424 A1 | 8/2009 | Bianco et al. | |

FOREIGN PATENT DOCUMENTS

| | | |
|---|---|---|
| DE | 102007006996 | 8/2008 |
| DE | 102008038825 | 9/2009 |
| FR | 2857444 | 1/2005 |
| JP | 2004044715 | 2/2004 |

* cited by examiner

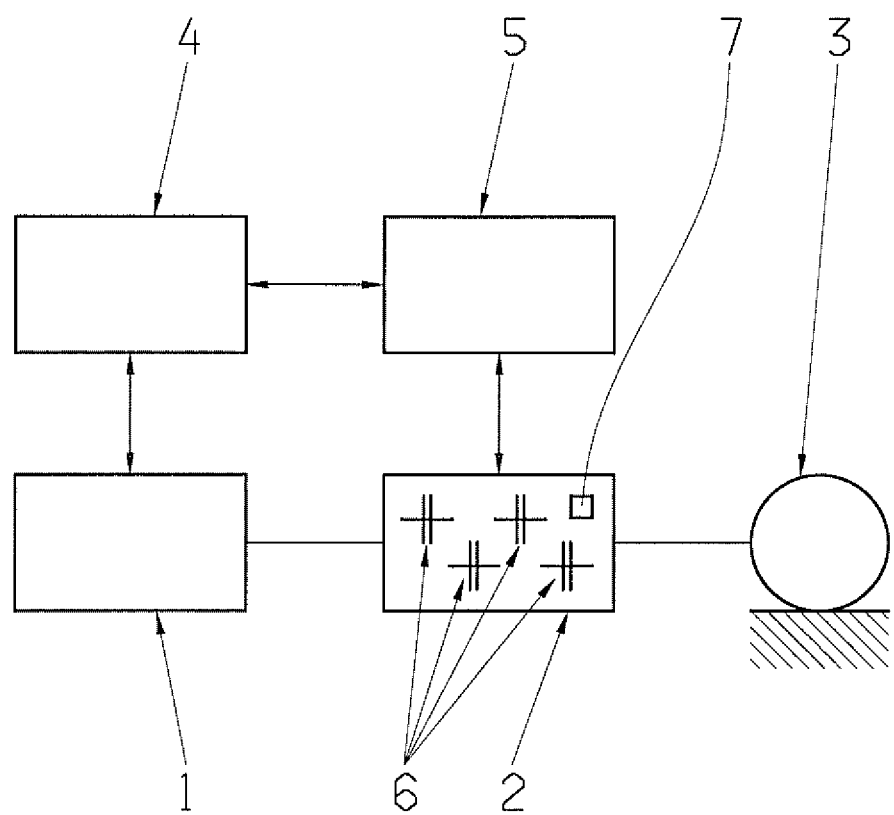

METHOD FOR ADAPTING SHIFTS IN A MOTOR VEHICLE TRANSMISSION

FIELD OF THE INVENTION

The invention relates to a method for adapting shifts to be carried out in a transmission of a motor vehicle, wherein the shifts are triggered by a transmission control unit of the transmission and their operation is controlled and/or governed by the transmission control unit, whereas at least one actual value corresponding to an acceleration of the motor vehicle is recorded by measuring instruments with such actual value compared to a corresponding target value, and on the basis of a deviation between the actual value and the target value, the carrying out of the subsequent shifts of the transmission control unit is adapted. The invention also relates to a transmission control unit.

BACKGROUND

DE 10 2007 006 996 A1 discloses a shifting strategy for a transmission of a motor vehicle. According to this shifting strategy, for adapting shifts to be carried out in a transmission, at least one acceleration value corresponding to the acceleration of the motor vehicle, namely an actual value, is recorded by measuring instruments, whereas such actual value of the transmission control unit is compared to a target value. On the basis of a deviation between the actual value and the target value, the carrying out of the subsequent shifts of the transmission control unit is adapted, namely by the fact that at least one clutch is readjusted during the ongoing shift processes and/or re-shifting processes. With such method known from the state of the art, it is already possible to adapt shift processes to some extent.

SUMMARY OF THE INVENTION

Based on the state of the art, this invention is subject to the task of creating a new method for adapting shifts to be carried out in a transmission of a motor vehicle and a transmission control device for carrying out the method. Additional objects and advantages of the invention will be set forth in part in the following description, or may be obvious from the description, or may be learned through practice of the invention.

In accordance with aspects of the invention, the actual value, or each actual value, corresponding to an acceleration of the motor vehicle is individually recorded for several consecutive shift stages of each shift, whereas the actual value in the individual shift stages is compared to the target value in the individual shift stages of the transmission control unit, and whereas, on the basis of a deviation in the individual shift stages between the actual value and the target value, the carrying out of the subsequent shifts of the transmission control unit is individually adapted for each shift stage.

According to an additional aspect of the invention, the actual values are extracted through a sampling of a tilt sensor of the motor vehicle, in particular a tilt sensor of the transmission.

According to another aspect of the invention, on the one hand, one actual value corresponding to a longitudinal acceleration of the motor vehicle and, on the other hand, one actual value corresponding to a vertical acceleration of the motor vehicle are determined.

With all of the aspects of the present invention, which can be used either alone or in a combination of two of the aspects or in a combination of all of the aspects, the adapting of shifts to be carried out can be further improved.

With the first aspect of the invention discussed above, which provides for an adapting in the individual shift stages of the shifts to be carried out, it is possible to specifically adapt those shift stages for which a relatively large deviation between the actual value and the target value is determined. Through the division of shifts into various shift stages, it is further possible to consider and individually adapt different types of shifts, for example, shifts with a closed clutch along with shifts with synchronization, either through the drive unit or a clutch of the transmission.

With the second aspect of the invention discussed above, it is possible to undertake the adapting through a corresponding sampling of the tilt sensor of the motor vehicle, such that no additional hardware is required to carry out the method under the invention.

With the third aspect of the invention discussed above, which provides for, on the one hand, the determination of one actual value for a longitudinal acceleration value and, on the other hand, the determination of one actual value for a vertical acceleration value, the adapting of shifts can be further improved.

The invention also encompasses a transmission control unit to carry out the various method embodiments described herein.

Preferred additional forms of the invention arise from the following description and claims. Embodiments of the invention are, without any limitation, described in more detail by the drawing.

BRIEF DESCRIPTION OF THE DRAWING

FIG. 1: a diagram of a drive train of a motor vehicle.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a diagram of a drive train of a motor vehicle with a drive unit 1, a transmission 2, and an output drive 3. The operation of the drive unit 1 is controlled and/or governed by a motor control unit 4, whereas, for this purpose, the motor control device 4 exchanges data with the drive unit 1. The operation of the automatic or automated transmission 2 is controlled and/or governed by a transmission control unit 5, which exchanges data with the transmission 2 for this purpose. In addition, the motor control unit 4 and the transmission control unit 5 exchange data with each other.

The transmission control unit 5 particularly serves the purpose of triggering shifts in the transmission 2 and controlling and/or governing the operation of the shifts in the transmission 2. In the execution of a shift in the transmission 2, at least one shifting element 6 of the transmission 2 is typically involved, whereas the shifting element 6, or each shifting element 6, can be designed as a clutch or a brake. Furthermore, FIG. 1 shows that a tilt sensor 7 is assigned to the automatic or automated transmission 2. In practice, this tilt sensor is used solely to determine the tilt of the motor vehicle.

The present invention also relates to a method along with a transmission control unit 5, with the assistance of which shifts to be carried out in the transmission 2 can be adapted, in order to ensure shifts with a high degree of shifting comfort, and indeed over the service life of the motor vehicle, with the possible aging of the components of the transmission 2 involved in the carrying out of the shifts.

For the adapting of the shifts to be carried out in the transmission 2, according to a first aspect of the invention, one actual value in the individual shift stage, which corresponds to at least one acceleration of motor vehicle, is recorded by measuring instruments for several consecutive shift stages of each shift, whereas the actual value in the individual shift stages is compared to the target value in the individual shift stages of the transmission control unit 5. On the basis of a deviation in the individual shift stages between the particular actual value and the particular target value, the carrying out of the subsequent shifts of the transmission control unit 5 is individually adapted for each of the relevant shift stages. If the deviation in a shift stage between the particular actual value in the individual shift stage and the target value in the individual shift stage is large, an uncomfortable execution of the particular shift stage is inferred, such that this shift stage is then adapted for a subsequent shift. However, if the deviation in a shift stage between the actual value in the individual shift stage and the target value in the individual shift stage is small, it can be inferred that the particular shift stage is carried out comfortably, such that no adapting is necessary for such a shift stage.

According to an advantageous additional form, each shift is subdivided into the shift stages of load reduction stage, gear disengaging stage, neutral stage, gear engaging stage, and load buildup stage, whereas it is preferable that, for each of these shift stages, one actual value in the individual shift stage is determined and compared to one target value in the individual shift stage, in order to determine, for each of such shift stages, a deviation in the individual shift stage between the particular actual value and the particular target value. In this case, on the basis of the deviations in the individual shift stages, the execution of each stage of a subsequent shift can then be individually adapted.

In the load reduction stage, the load reduction takes place through a drive unit 1 or a shifting element 6 of the transmission 2 involved in the shift, whereas, if a large deviation between the actual value in the individual shift stage and the target value in the individual shift stage is determined for the load reduction stage, for the adapting of this shift stage, a load reduction process of the drive unit 1 and/or a load reduction process of the particular shifting element 6 involved can be adapted. With the load reduction process, it is specifically a load reduction gradient that is adjusted.

In the shift stage of the gear disengaging stage, when disengaging the gear, knocks may develop in the drive train, for example if a gear is disengaged upon a high torque in the drive train, whereas if a deviation between the particular actual value and the particular target value that is too high is determined for the gear disengaging stage, the point in time of the gear disengagement may vary for adjusting and/or adapting the gear disengaging stage.

In a neutral stage of a shift, a so-called "tooth-to-tooth position" in the transmission 2 may arise and unravel, which will lead to undesired motor vehicle reactions and thus undesired accelerations in the motor vehicle, whereas, if a relatively large deviation between the particular actual value in the individual shift stage and the particular target value in the individual shift stage is determined for the neutral stage, the drive unit torque or transmission torque can be adjusted, which is used to disband the tooth-to-tooth position in the transmission 2.

In the gear engaging stage, depending on the type of transmission 2, a synchronization is initially reached, and a synchronous force is built up for this purpose. Only then does the gear engagement take place for a defined differential rotation speed. Thereby, the gear engagement can take place upon a differential rotation speed that is too high, by which undesired accelerations in the motor vehicle are also brought about.

Accordingly, if a deviation between the particular actual value in the individual shift stage and the particular target value in the individual shift stage that is too high is determined for a gear engaging stage, for adapting such gear engaging stage, the buildup of the synchronous force (for example) may be adapted through a modification of the forces or the target path gradients.

In the load buildup stage, there can be a distinction between a load buildup for a slipping shifting element and a load buildup with an adhering shifting element. For a load buildup with a slipping shifting element, to reduce undesired deviations between the particular actual value in the individual shift stage and the particular target value in the individual shift stage, engaging gradients may be modified. For a load buildup with an adhering clutch, load buildup processes, in particular load buildup gradients, may be modified on the drive unit 1.

Accordingly, under the first aspect of the invention, a shift is subdivided into different shift stages and one actual value is recorded for each shift stage, which corresponds to an acceleration of the motor vehicle and is compared to a corresponding target value, in order to, on the basis of a deviation between the actual value in the individual shift stage and the target value in the individual shift stage, individually adapt the particular shift stage of the subsequent shifts to be carried out.

Under a second aspect of the present invention, the actual value, or each actual value, which corresponds to an acceleration of the motor vehicle, is extracted by a sampling the tilt sensor 7. The sampling rate of the sensor 7 is selected such that, for each of the shift stages of load reduction stage, gear disengaging stage, neutral stage, gear engaging stage, and load buildup stage, at least one actual value in the individual shift stage is determined, which can then be compared to a target value in the individual shift stage, in order to undertake the above adaptation in the individual shift stages of the shifts to be carried out for the individual shift stages.

Accordingly, the sampling rate of the tilt sensor 7 is increased significantly when compared to the state of the art, in which a tilt sensor is used solely to determine the tilt of the motor vehicle, such that the tilt sensor 7 can be used as an acceleration sensor and accordingly provide the corresponding actual values for the individual shift stages.

Under an additional aspect of the invention, a tilt sensor 7 makes another function accessible, namely the provision of actual values corresponding to an acceleration of the motor vehicle, on the basis of which shift stages of the shifts to be carried out are adapted.

Under another aspect of the present invention, for each of the shift stages of a shift to be carried out, it is not the case that only one actual value corresponding to the acceleration of the motor vehicle is recorded by measuring instruments; rather, there is a recording of, on the one hand, one actual value corresponding to a longitudinal acceleration of the motor vehicle and, on the other hand, one actual value corresponding to a vertical acceleration of the motor vehicle. Each of such values can be extracted from the sampling of the tilt sensor 7.

It is then possible to compare for each of the shift stages, on the one hand, the actual value corresponding to the longitudinal acceleration of the motor vehicle and the actual value corresponding to the vertical acceleration of the motor vehicle, in order to determine, regarding the longitudinal acceleration and/or the vertical acceleration of the motor vehicle in the corresponding shift stage, whether there is an impermissibly large deviation, in order to then adapt the corresponding shift stage independent of this.

However, in contrast to this, it is also possible to allocate the actual value corresponding to a longitudinal acceleration of the motor vehicle and the actual value corresponding to a vertical acceleration of the motor vehicle to a cumulated actual value, and compare this cumulated actual value with a corresponding target value, in order to undertake, on the basis of this deviation, the adapting of the corresponding shift stages in each individual shift stage.

Through the use of several actual values, namely the actual values corresponding to the longitudinal acceleration and the actual values corresponding to the vertical acceleration, a further improvement in adapting shift processes in an automatic or automated transmission can be realized.

The method for adapting shifts to be carried out in a transmission of a motor vehicle is implemented in a transmission control unit 5 and is carried out by the same. For this purpose, the transmission control unit 5 includes means for carrying out the method. These means may include an interface for exchanging data with the transmission 2 and the tilt sensor 7, a processor for evaluating the actual values, and a memory for keeping available the corresponding target values.

The target values are particularly dependent on a loading of the motor vehicle and/or a driver's request and/or a driving resistance and/or a gear step to be carried out with the shift. Different target values can be kept ready for different loadings and/or driver's requests and/or driving resistances and/or gear steps. For this purpose, additional input data must be kept ready and evaluated, for example a dimension of the motor vehicle or a driving pedal actuation.

The shifting parameters adjusted through the adapting, such as an adjusted load reduction gradient, are stored in the memory of the transmission control unit of 5 for adapting the subsequent shifts.

Modifications and variations can be made to the embodiments illustrated or described herein without departing from the scope and spirit of the invention as set forth in the appended claims.

The invention claimed is:

1. A method for adapting shifts to be carried out in a transmission of a motor vehicle, wherein the shifts are triggered and controlled by a transmission control unit, the method comprising:
   recording by a measuring instrument an actual value corresponding to an acceleration of the motor vehicle, the measuring instrument having a sampling rate selected such that the measuring instrument provides the actual value for each of a plurality of consecutive shift stages for each shift, the plurality of consecutive shift stages including a load reduction stage, a gear disengaging stage, a neutral stage, a gear engaging stage and a load buildup stage;
   with the transmission control unit, comparing the recorded actual value for each respective shift stage to a target value for each respective shift stage; and
   as a function of a deviation in the individual shift stages between the actual value and the target value, adapting the respective shift stages with the transmission control unit for subsequent shifts of the transmission, the deviation between the particular actual value and the particular target value being determined for all of the consecutive shift stages.

2. The method as in claim 1, wherein the actual values corresponding to an acceleration of the motor vehicle are generated by a sampling of a tilt sensor operatively configured with the transmission.

3. The method as in claim 1, wherein the actual values corresponding to an acceleration of the motor vehicle correspond to an actual value of a longitudinal acceleration of the motor vehicle and an actual value of a vertical acceleration of the motor vehicle.

4. The method as in claim 3, wherein the actual value of a longitudinal acceleration of the motor vehicle is compared to a target value of the longitudinal acceleration of the motor vehicle, and the actual value of a vertical acceleration of the motor vehicle is compared to a target value of the vertical acceleration of the motor vehicle.

5. The method as in claim 4, wherein the actual value of a longitudinal acceleration of the motor vehicle and the actual value of a vertical acceleration of the motor vehicle are allocated to a cumulative actual value that is compared to the target value.

6. A method for adapting shifts to be carried out in a transmission of a motor vehicle, wherein the shifts are triggered and controlled by a transmission control unit, the method comprising:
   recording by a measuring instrument an actual value corresponding to an acceleration of the motor vehicle;
   with the transmission control unit, comparing the recorded actual value to a target value; and
   as a function of a deviation between the actual value and the target value adapting the subsequent shifts of the transmission with the transmission control unit;
   wherein each transmission shift comprises a plurality of shift stages, the plurality of shift stages of each transmission shift including individual shift stages of load reduction stage, gear disengaging stage, neutral stage, gear engaging stage and load buildup stage, the actual value corresponding to the acceleration of the motor vehicle is generated by a sampling of a tilt sensor operatively configured with the transmission, and a sampling rate of the tilt sensor is selected so as to determine the actual value for each of the individual shift stages of each transmission shift.

7. A method for adapting shifts to be carried out in a transmission of a motor vehicle, wherein the shifts are triggered and controlled by a transmission control unit, the method comprising:
   recording by a measuring instrument an actual value corresponding to an acceleration of the motor vehicle;
   with the transmission control unit, comparing the recorded actual value to a target value; and
   as a function of a deviation between the actual value and the target value, adapting the subsequent shifts of the transmission with the transmission control unit;
   wherein the actual value corresponding to an acceleration of the motor vehicle corresponds to an actual value of a longitudinal acceleration of the motor vehicle and an actual value of a vertical acceleration of the motor vehicle; and
   wherein the measuring instrument has a sampling rate selected such that the measuring instrument provides the actual value for each of a plurality of shift stages for each shift, the plurality of consecutive shift stages including a load reduction stage, a gear disengaging stage, a neutral stage, a gear engaging stage and a load buildup stage, the deviation between the particular actual value and the particular target value being determined for all of the consecutive shift stages.

8. The method as in claim 7, wherein the actual value of a longitudinal acceleration of the motor vehicle is compared to a target value of the longitudinal acceleration of the motor vehicle, and the actual value of a vertical acceleration of the motor vehicle is compared to a target value of the vertical acceleration of the motor vehicle.

9. The method as in claim 7, wherein the actual value of a longitudinal acceleration of the motor vehicle and the actual value of a vertical acceleration of the motor vehicle are allocated to a cumulative actual value that is compared to a target value.

10. A transmission control unit for a motor vehicle configured to adapt transmission shifts of the motor vehicle, the transmission control unit comprising:
a measuring instrument configured to record an actual value corresponding to an acceleration of the motor vehicle, the measuring instrument having a sampling rate selected such that the measuring instrument provides the actual value for each of a plurality of consecutive shift stages for each transmission shift, the plurality of consecutive shift stages including a load reduction stage, a gear disengaging stage, a neutral stage, a gear engaging stage and a load buildup stage;
the transmission control unit configured to compare the recorded actual value for each respective shift stage to a target value for each respective shift stage for all of the consecutive shift stages; and
as a function of a deviation in the individual shift stages between the actual value and the target value, the transmission control unit configured to adapt the respective shift stages for subsequent shifts of the transmission.

11. The transmission control unit as in claim 10, further comprising a tilt sensor operatively configured with the transmission, wherein the actual values corresponding to an acceleration of the motor vehicle are generated by a sampling of the tilt sensor.

12. The transmission control unit as in claim 11, wherein the tilt sensor is configured to generate an actual value of a longitudinal acceleration of the motor vehicle and an actual value of a vertical acceleration of the motor vehicle.

13. The transmission control unit as in claim 12, wherein the transmission control unit is configured to compare the actual value of a longitudinal acceleration of the motor vehicle to a target value of the longitudinal acceleration of the motor vehicle, and to compare the actual value of a vertical acceleration of the motor vehicle to a target value of the vertical acceleration of the motor vehicle.

14. The transmission control unit as in claim 13, wherein the transmission control unit is configured to allocate the actual value of a longitudinal acceleration of the motor vehicle and the actual value of a vertical acceleration of the motor vehicle to a cumulative actual value that is compared to the target value.

* * * * *